J. J. RUNCK.
AGRICULTURAL IMPLEMENT.
APPLICATION FILED SEPT. 18, 1916.

1,266,719.

Patented May 21, 1918.
4 SHEETS—SHEET 1.

Witnesses

Inventor
J. J. Runck
By Chandler & Chandler
Attorney

J. J. RUNCK.
AGRICULTURAL IMPLEMENT.
APPLICATION FILED SEPT. 18, 1916.

1,266,719.

Patented May 21, 1918.
4 SHEETS—SHEET 2.

Inventor
J. J. Runck

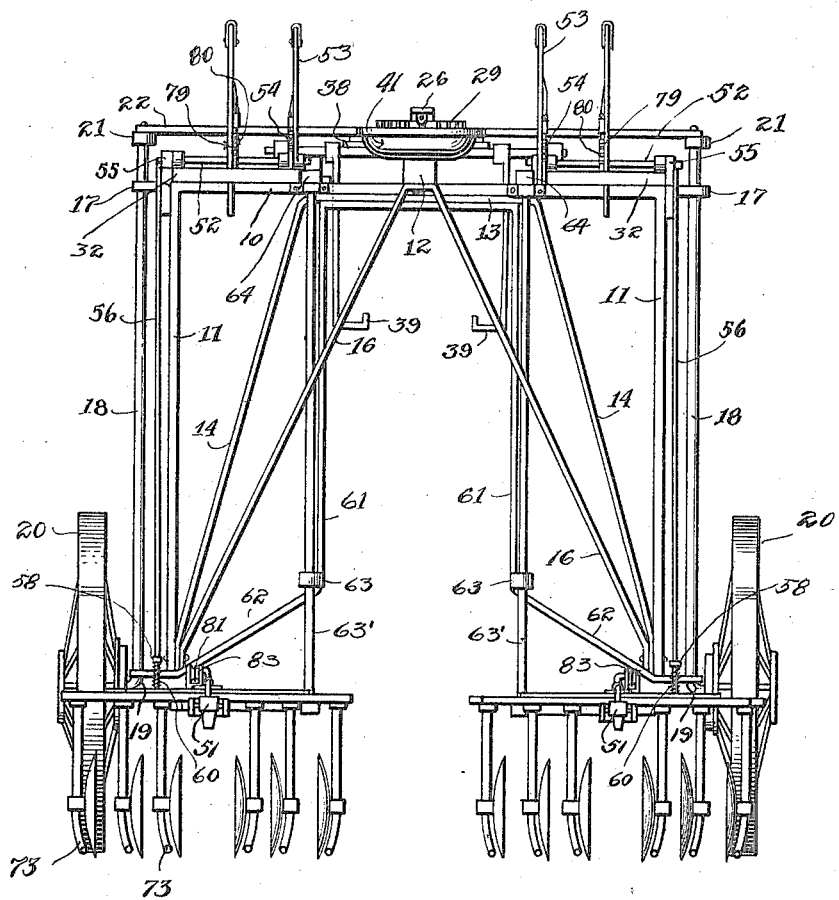
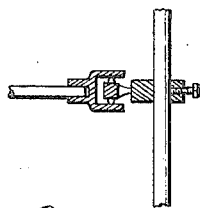

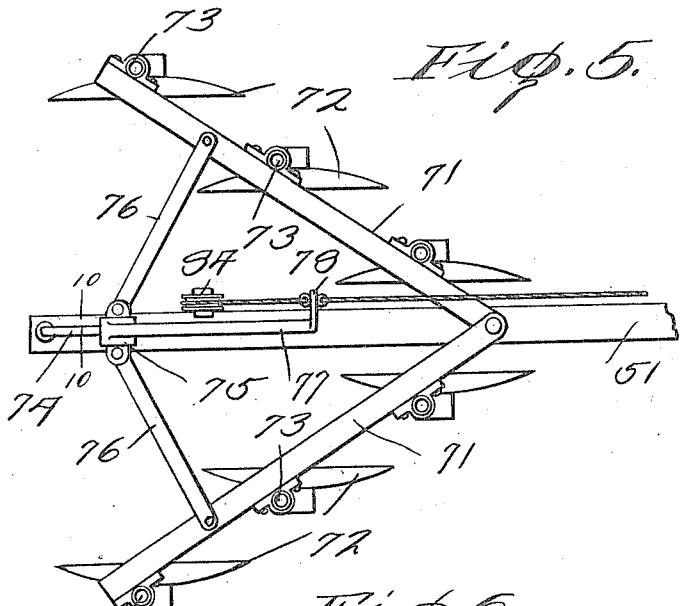
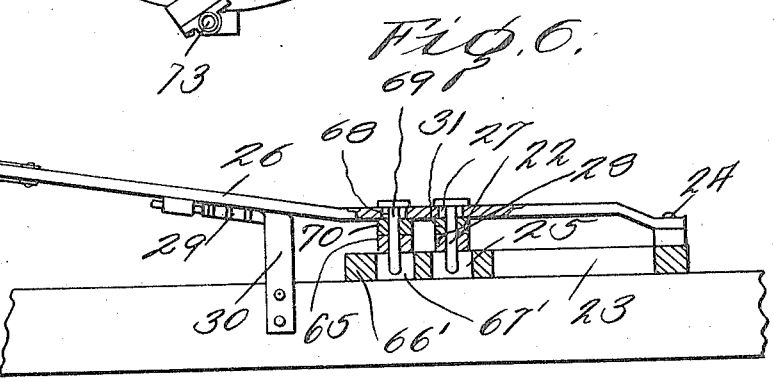
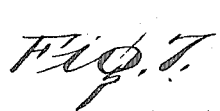
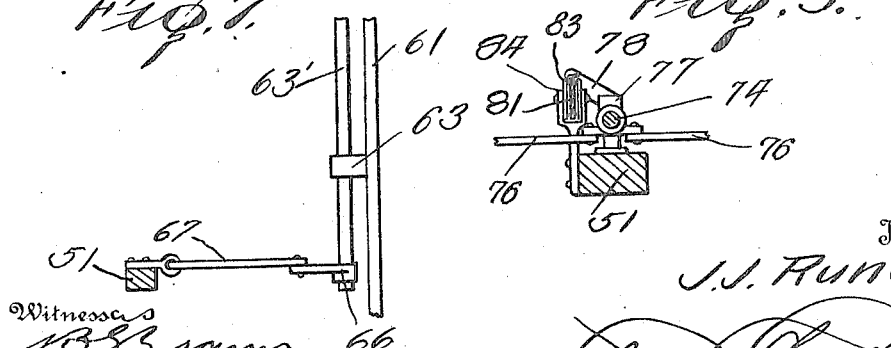

UNITED STATES PATENT OFFICE.

JOHN J. RUNCK, OF REPUBLICAN CITY, NEBRASKA.

AGRICULTURAL IMPLEMENT.

1,266,719.  Specification of Letters Patent.  Patented May 21, 1918.

Application filed September 18, 1916. Serial No. 120,739.

*To all whom it may concern:*

Be it known that I, JOHN J. RUNCK, a citizen of the United States, residing at Republican City, in the county of Harlan, State of Nebraska, have invented certain new and useful Improvements in Agricultural Implements; and I do hereby declare the following to be a full, clear, and exact description of the invention, such as will enable others skilled in the art to which it appertains to make and use the same.

This invention relates to agricultural implements and has special reference to a two row grain drill.

In the ordinary type of two row drills the arch bar employed is barely of sufficient height to permit the passage of comparatively young plants between the two sets of drills and the drill cannot be used in corn fields and other like places after the plants have grown up to any height.

One important object of the present invention is to provide an improved and simplified form of drill adapted for use in connection with corn and other like plants which is greatly advanced in its growth, provision being made for straddling a row of plants of considerable height.

One of the chief reasons for the inability of other drills to be capable of use with rows of tall plants is that the tongue which is used with two row drills is in the ordinary drill so low that it is useless to make the arch bar very high because the tongue itself will knock down the growing plants if they are advanced in growth.

A second important object of the invention is to provide an arrangement by means of which a very high tongue can be used.

In order to accommodate a high pole of this character where a team of horses is used it is essential that the reins shall also be carried at a height over the row of corn or the like and a third important object of the invention is to provide a grain drill of this character wherein the reins are carried well over the tops of the growing plants.

Furthermore, when the grain drill is used with tall plants it is necessary that the driver or operator be in position so that he can see over the top of the row.

A fourth important object of the invention is therefore to provide an improved grain drill wherein the operator will be seated above the top of the growing or grown plant and at the same time have all of the necessary operating levers conveniently within his reach.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Fig. 3 is a rear elevation thereof.

Fig. 5 is a detail plan view showing a portion of the frame with one of the drill gangs.

Fig. 6 is a detail view partly in side elevation and partly in section showing a certain lever, used in connection therewith.

Fig. 7 is a detail side elevation of a portion of the frame showing a vertical shaft used in connection therewith.

Fig. 8 is a detail section on the line 9—9 of Fig. 2.

Fig. 9 is a detail section on the line 10—10 of Fig. 5.

Figure 1:
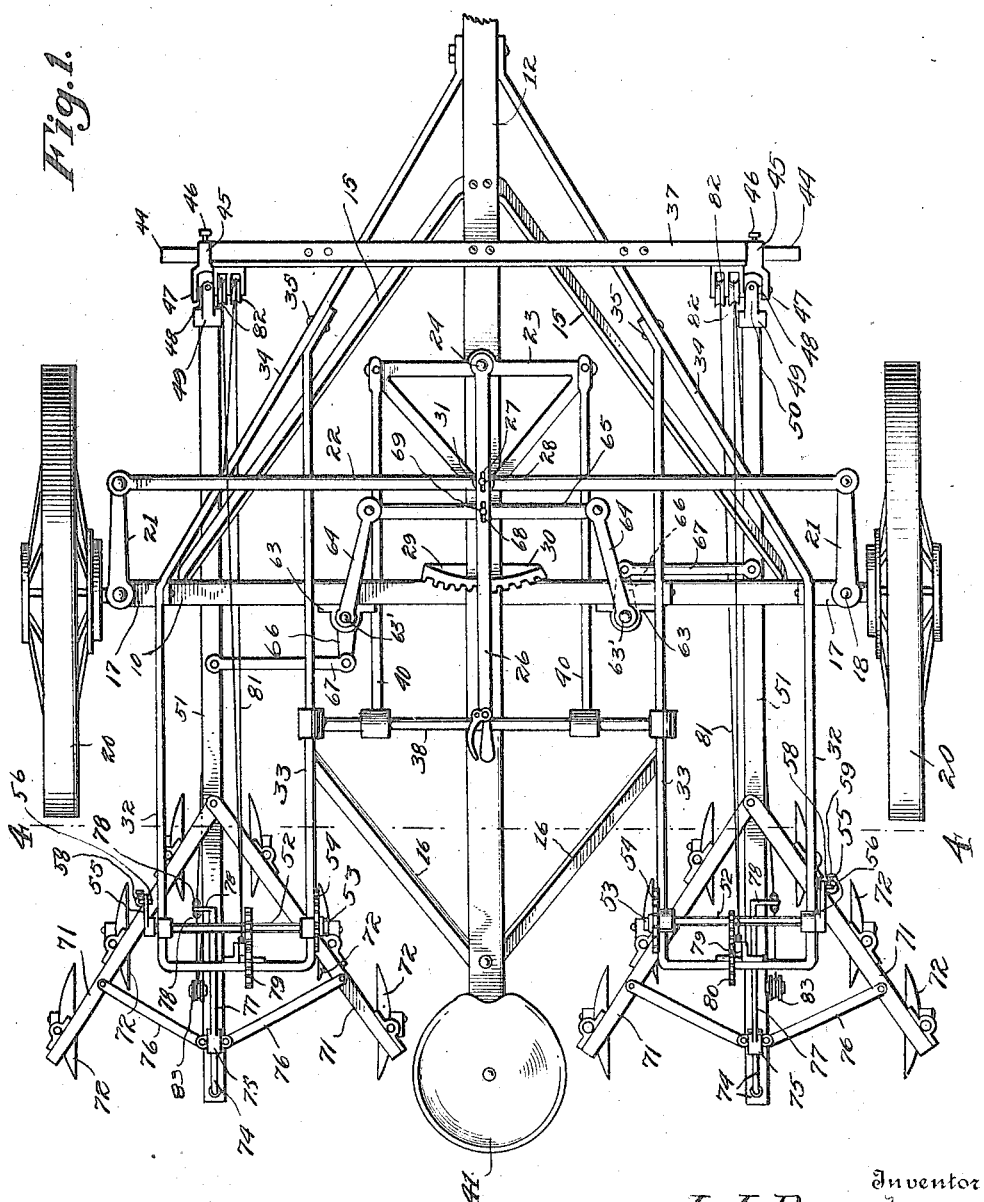
Figure 1 is a plan view of a grain drill constructed in accordance with this invention.
Figure 2:
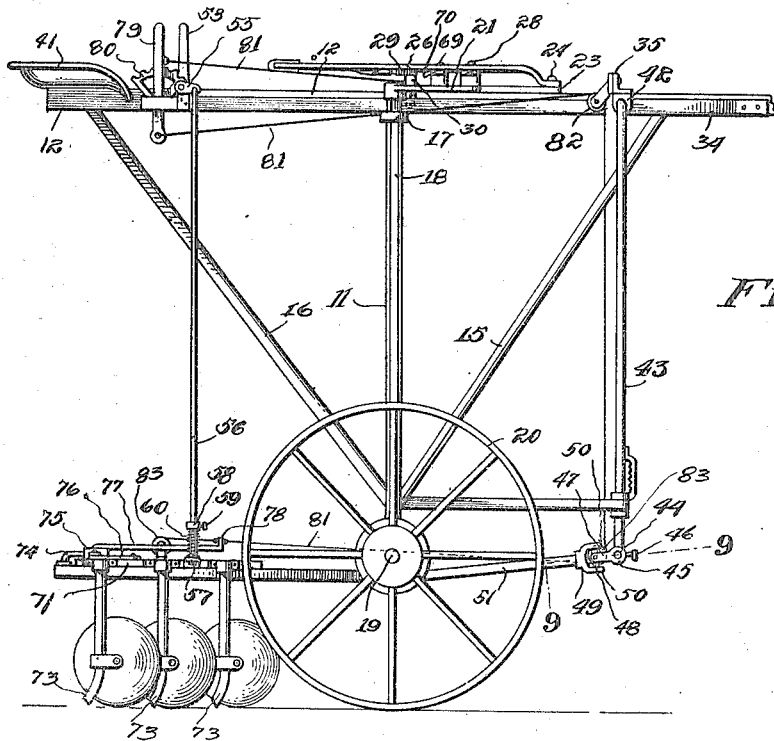
Fig. 2 is a side elevation thereof.
Figure 4:
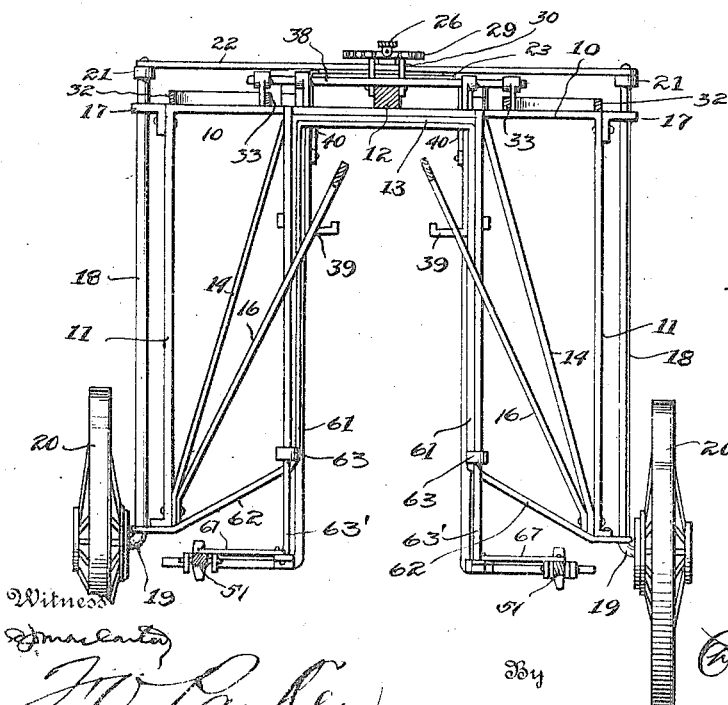
Fig. 4 is a section on the line 4—4 of Fig. 1.

In the embodiment of the invention herein illustrated there is provided a main arch frame of inverted U-shape. The bight portion of this frame runs across the machine as at 10 while the legs extend downward at each side as at 11. Fixed to this bight portion 10 is a tongue or main longitudinal draft beam 12. Secured to the bottom ends of the legs 11 and to the bight portion 10 adjacent the beam 12 is a second arch frame comprising the bight portion 13 and diverging leg portions 14. By this means the legs 11 are braced laterally to the center of the bight portion 10 and consequently to the tongue 12. In addition to these diverging leg portions forming braces 14, other arch braces 15 are connected to the lower ends of the legs 11 and to the tongue 12 forward of the connection of the bight portion 10, there is provided a similar rear brace arch 16 also connected to the lower ends of the leg 11 and to the tongue 12. Thus these parts are all firmly braced together. Fixed to the upper and lower parts of the legs 11 are bearings 17 which are vertically alined and in these alined bearings are supported shafts 18 the lower ends of which are turned outward and formed as stub axles 19. On these stub axles 19 are mounted the usual ground wheels 20. Extending forwardly from the shaft 18 at the upper ends thereof are the rock arms 21 and these rock arms are connected by a link 22 so that when one of the rock arms is moved the other will be moved in corresponding directions. By this means the ground wheels 20 may be set at desired angles to the beam or tongue 12.

In order to effect lateral movement of the link 22 there is mounted on the tongue 12 a triangular lever 23, the lever being pivoted intermediate its base to the tongue or beam as indicated at 24. This lever has its apex extending rearwardly and lying beneath the link 22, being there provided with a slot 25. Pivoted to the pivot 24 is a latch lever 26 which is likewise provided with a slot 27 adapted to register with the slot 25. Through these slots 27 and 25 and extending through the link 22 is a pin 28. This latch lever 26 coöperates with a quadrant 29 carried on a base 30 fixed to the tongue or beam 12. By this means movement of the latch lever 26 toward one side or the other effects corresponding movement of the link 22 and the ground wheels when the pin is in place in the slots 27 and 25. At times, however, it is desirable to operate the link 22 without reference to the latch lever 26 and in order to permit this operation the latch lever 26 is supported above the link by a washer 31 as shown in Fig. 6 so that when it is wished to connect only the triangular lever and the link 22 the pin 28 may be withdrawn and the washer removed so that a shorter pin may be substituted, the head of the shorter pin filling the place of the washer and thus leaving the lever 26 disconnected.

Mounted on the bight portion 10 adjacent each side of the machine are longitudinal upper frames 32, which have their outer sides extending from the outer ends of the bight portion 10 to the beam 12 bent to provide forwardly convergent or diagonal braces 34, the same being continuations of the frames 32 to which the forward ends of the inner sides 33 of said frames are connected as at 35. The diagonal braces 34 of the frames 32 have connected thereto a cross bar 37 which is also connected to the beam or tongue 12 in any suitable manner.

Connecting the frames 32 to the rear of the bight portion 10 there is provided a bar 38 and swinging from this bar 38 is a pair of depending foot levers 39 which are pivotally connected by links 40 with the forward corners of the triangular lever 23 as clearly seen in Fig. 1. By this means the triangular lever 23 may be operated from the operator's seat 41 which is located at the rear of the tongue 12. Thus when the lever 26 is disconnected the link 22 may be operated by foot to adjust the ground wheels.

Carried by the cross bar 37 are bearings 42 and swinging from these bearings 42 are hangers 43 which have their lower ends turned outwardly as at 44 and on these lower ends are mounted sleeves 45 which are held in adjusted position by means of set screws 46. The rear ends of these sleeves are provided with spaced arms 47 wherein is journaled the cross shaft 48 of a flexible coupling which permits vertical horizontal movement, the other member of the coupling being provided with a socket 49 and vertically spaced arms 50 to receive the other ends of the cross shaft 48. Fixed in each of the sockets 49 are gang beams 51.

In order to hold the rear end of the gang beams in proper elevation there is journaled to each pair of the frames 32 a rock shaft 52 and fixed to each of these rock shafts is a latch lever 53 which coöperates with a quadrant 54 fixed to a respective member 33. On each of the rock shafts 52 is a rock arm 55 and connecting this rock arm with the respective beam 51 adjacent its rear end is a link 56. Each of these links 56 has its lower end extending through the respective beam 51 and on the lower end is a nut 57. Furthermore, each link 56 is provided above the member 51 with a collar 58 held in position by a set screw 59 and between this collar and the respective beam 51 is a spring 60 which normally holds the beam 51 downward against the nut 57 but when the earth working tools strike an obstruction permits the respective beams 51 to rise by the compression of the spring 60.

Extending downward from the bight portion 13 are vertical legs 61 which have their lower ends connected to the lower ends of the legs 11 by diagonal braces 62. Fixed to the legs 61 are lower bearings 63. In these bearings 63 are mounted the shafts 63′ each of which has on its upper end a forwardly extending arm 64 the forward ends of these arms being connected by a link 65. Moreover each of these shafts carries on its lower end an arm 66, the arm of one shaft extending forwardly and the other rearwardly as shown in Fig. 1. The arm 66 is connected to a respective beam 51 by means of a link 67 and by reason of the fact that one arm 66 extends forwardly and the other rearwardly it will be obvious that any transverse movement of the link 65 will either draw both of the beams 61 toward each other or force them farther apart. Moreover, by reason of the link connection as at 67 the beams are permitted vertical movement independent of the adjustment of the shafts 63′, although it will be of course obvious that any vertical movement of the beams 51 will draw them slightly together or draw them slightly apart according to the position of the links 67 with regard to the horizontal. This however may be corrected by the proper movement of the arms 64 through the links 65. In order to effect connection between the triangular lever 23 and the links 65 this triangular lever is provided with a rearwardly extending tongue 66' having a slot 67' extending longitudinally thereof. The lever 26 also is provided with a slot 68 which may be brought into registry with the slot 67' and through this slot 68 and the slot 67' passes a pin 69 which also passes through an opening in the link 65 and through a washer 70, thus making a connection similar to that described between the link 22 and the lever 26 and triangular lever 23. It will be obvious that this connection may also be disconnected by the lever 26 and a shorter pin 69 used, the washer being removed as before. It will be obvious also that in both of these connections the triangular lever 23 may be disconnected from either of the links 22 or 65 by the substitution of a shorter pin in place of the pins 69 and 28 so that either or both of the links 65 and 22 may be operated by either or both of the levers 23 and 26.

Pivoted to each of the beams 51 adjacent its rear end is a pair of arms 71 which carry the earth working tools 72, here shown as plow disks although it is obvious that shovels may be substituted therefor. Moreover these arms 71 support drill boots 73 for the connection of the tubes of a seed distributer (not shown). Mounted on each of the beams 51 is a guide 74 and slidable on this guide is a sleeve 75 which is connected to the respective arm 71 by links 76. By means of this arrangement when the sleeve is moved in one direction the arms 71 are forced apart while, when the sleeve is moved in the opposite direction, the arms 71 are drawn together. Extending forward from the sleeve 75 is a rod 77 which terminates in a laterally extending arm 78. Pivoted on each of the bars 36 is a lever 79 provided with the usual latch and coöperating with a quadrant 80. This lever is pivoted intermediate its ends and connected to the lever above and below the pivot points are twisted wire cables 81 which lead forwardly and over pulleys 82 mounted in brackets on the member 37 so that the axis of the pulleys will be in alinement with the pivot points of the hangers 43. At the lower end of these pulleys and in alinement with the cross shaft 48 are other pulleys 83 over which the cables pass and one of these cables has its end directly connected to the end 78 of the member 77 while the other cable runs over a pulley 84 carried by the respective beam 51 and is then connected to the member 78. By means of this arrangement the sleeve 75 may be moved in either direction and when so moved will always be held in proper relation on the guide 74 so that the arms 71 will be kept at the desired spread. It will be obvious that this is effected by reason of the fact that the pulleys 82 and 83 have their axes in the axes of swing of the members 43 and beams 51 respectively so that no amount of movement in any direction of the beam 51 will effect the position of the sleeve 75.

There has thus been provided a highly efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In an agricultural implement of the character described, an elevated wheeled frame, hangers forwardly of and depending from the frame, drag beams arranged between the wheels of the frame, flexible couplings connecting the forward ends of the beams with the hangers for vertical and horizontal movement of said beams, a pair of arms pivoted at their forward ends to each beam, a guide on each beam between the arms, a slide movably supported on the guide, links pivotally connecting the arms to the slides, throw levers pivotally mounted on the frame at opposite sides of its longitudinal center, guide pulleys in the frame and on the beams, flexible connections trained over the guide pulleys and engaged with the sleeves and said throw levers, and means on the frame and connected with the beams for laterally adjusting said beams.

2. In an agricultural implement of the character described, an elevated wheeled frame, hangers forwardly of and depending from the frame, drag beams arranged between the wheels of the frame, flexible couplings connecting the forward ends of the beams with the hangers for vertical and horizontal movement of said beams, a pair of arms pivoted at their forward ends to each beam, a guide on each beam between the arms, a slide movably supported on the guide, links pivotally connecting the arms to the slides, throw levers pivotally mounted on the frame at opposite sides of its longitudinal center, guide pulleys in the frame and on the beams, flexible connections trained over the guide pulleys and engaged with the sleeves and said throw levers, means on the frame and connected with the beams for laterally adjusting said beams, horizontally swinging axles for the wheels of the frame, and means on the frame for manually turning the axles and adapted for detachable connection with the last named means.

3. In an agricultural implement of the character described, an elevated wheeled frame, hangers depending from the frame, drag beams arranged between the wheels of the frame, flexible couplings connecting the beams to the hangers, means on the frame and connected with the beams for laterally adjusting the same, a cross bar in the frame rearwardly of said means, foot levers pivotally depending from said bar, a manually operable lever connected with said means for operating the same, horizontal turning axles for the wheels of the frame, means for turning the axles and detachably connected with the manually operable lever, and connections between the foot levers and said last named means.

In testimony whereof, I affix my signature, in the presence of two witnesses.

JOHN J. RUNCK.

Witnesses:
K. G. HASKINS,
C. H. WALDO.

Copies of this patent may be obtained for five cents each, by addressing the "Commissioner of Patents, Washington, D. C."